US012794991B2

(12) United States Patent
Cho et al.

(10) Patent No.: US 12,794,991 B2
(45) Date of Patent: Nov. 10, 2026

(54) APPARATUS AND METHOD FOR IDENTIFYING NETWORK DEVICE BASED ON NETWORK BEHAVIOR

(71) Applicant: Industrial Technology Research Institute, Hsinchu (TW)

(72) Inventors: Chuan-Yu Cho, Hsinchu City (TW); Che-Hao Liu, Taichung City (TW); Chen Yi Ho, Taoyuan City (TW); Chia-Jung Hsu, Kaohsiung City (TW)

(73) Assignee: Industrial Technology Research Institute, Hsinchu (TW)

( * ) Notice: Subject to any disclaimer, the term of this patent is extended or adjusted under 35 U.S.C. 154(b) by 44 days.

(21) Appl. No.: 18/959,638

(22) Filed: Nov. 26, 2024

(65) Prior Publication Data

US 2026/0149754 A1 May 28, 2026

(51) Int. Cl.
*G06F 15/173* (2006.01)
*H04L 67/50* (2022.01)
*H04L 69/165* (2022.01)

(52) U.S. Cl.
CPC .......... *H04L 67/535* (2022.05); *H04L 69/165* (2013.01)

(58) Field of Classification Search
CPC ............................ H04L 67/535; H04L 69/165
See application file for complete search history.

(56) References Cited

U.S. PATENT DOCUMENTS 11,316,880 B2 4/2022 Garg et al.
2013/0097706 A1 4/2013 Titonis et al.
2016/0315952 A1* 10/2016 Komárek ............ H04L 61/2514
(Continued)

FOREIGN PATENT DOCUMENTS

CN 106302397 4/2019
CN 117614741 2/2024
(Continued)

OTHER PUBLICATIONS

Imran Makhdoom et al., “Detecting Compromised IoT Devices: Existing Techniques, Challenges, and A Way Forward”, Computers and Security, Jul. 2023, pp. 1-48.
(Continued)

*Primary Examiner* — Joseph R Maniwang
(74) *Attorney, Agent, or Firm* — JCIPRNET

(57) ABSTRACT

An apparatus and a method for identifying a network device based on network behavior are provided. The method is adapted for an electronic apparatus having a processor to identify a network device connected to a network and includes following steps. Network behavior data of plural network devices connected to the network are retrieved; plural pieces of behavior information associated with each network device are retrieved from the network behavior data, a tag is generated by using the behavior information to create a behavior description for each network device and record the behavior descriptions in an identification database, and in response to retrieving current network behavior data, the behavior information in the current network behavior data are parsed and compared with the tag of each behavior description in the identification database, so as to identify the network device to which the current network behavior data belong based on a comparison result.

16 Claims, 6 Drawing Sheets

(56) References Cited

U.S. PATENT DOCUMENTS

| | | | | |
|---|---|---|---|---|
| 2022/0277047 | A1 | 9/2022 | Grossman et al. | |
| 2022/0385632 | A1 | 12/2022 | Naidoo | |
| 2023/0412594 | A1 | 12/2023 | Grover et al. | |
| 2024/0303511 | A1* | 9/2024 | Sesha | H04L 43/026 |

FOREIGN PATENT DOCUMENTS

| | | |
|---|---|---|
| TW | 202326481 | 7/2023 |
| TW | 202407578 | 2/2024 |
| TW | 202420786 | 5/2024 |

OTHER PUBLICATIONS

Carson Koball et al., "IoT Device Identification Using Unsupervised Machine Learning", Information, May 31, 2023, pp. 1-11.

Jianjin Zhao et al., "Efficient IoT Device Identification via Network Behavior Analysis Based on Time Series Dictionary", IEEE Internet of Things Journal, vol. 11, No. 3, Feb. 1, 2024, pp. 5129-5142.

Kahraman Kostas et al., "IoTDevID: A Behavior-Based Device Identification Method for the IoT", IEEE Internet of Things Journal, vol. 9, No. 23, Dec. 1, 2022, pp. 23741-23749.

* cited by examiner

400

| id | Communication protocol | Source IP address | Source port | Target IP address | Target port | Total count |
|---|---|---|---|---|---|---|
| 50 | tcp | 192.168.168.171 | Any | 35.80.177.106 | 443 | 8 |
| 8 | udp | 192.168.168.52 | Any | 192.168.168.1 | 53 | 44 |
| 141 | tcp | 192.168.168.171 | Any | 54.218.202.245 | 1443 | 1 |
| 107 | udp | 192.168.168.171 | Any | 15.204.9.161 | 3478 | 2 |
| 140 | tcp | 192.168.168.171 | Any | 34.219.85.253 | 1443 | 1 |

APPARATUS AND METHOD FOR IDENTIFYING NETWORK DEVICE BASED ON NETWORK BEHAVIOR

TECHNICAL FIELD

The disclosure relates to an apparatus and a method for device identification, and particularly to an apparatus and a method for identifying a network device based on network behavior.

DESCRIPTION OF RELATED ART

With the widespread adoption of the internet and the rise of network security threats, the urgency for enterprises and individuals to protect their network assets has significantly increased. Firewalls serve as the first line of defense in network security, primarily functioning to monitor, filter, and control data traffic that enters and exits the network. However, conventional firewalls rely heavily on preset rules and static policies, which makes it challenging to address the increasingly complex network threats and constantly evolving patterns of network behavior.

Information Technology (IT) personnel in typical enterprises generally lack relevant knowledge in security practices, network architectures, and network management, which can hinder their ability to effectively operate and manage even with the most powerful security tools, such as firewalls.

Besides, as many enterprises embrace digital transformation, they are increasingly connecting a diverse array of network devices to their internal networks. The quantity and variety of these devices are numerous, resulting in requiring operational staff to spend considerable time inventorying and monitoring them to implement comprehensive security management.

SUMMARY

The disclosure aims to provide an apparatus and a method for identifying a network device based on network behavior, which can increase the level of automation in network monitoring and management, reduce human intervention, and enhance overall network security protection capabilities.

The disclosure provides a method for identifying a network device based on network behavior, and the method is adapted for an electronic apparatus having a processor to identify the network device connected to a network. This method includes following steps. Network behavior data of a plurality of the network devices connected to the network are retrieved. A plurality of pieces of behavior information associated with each network device are retrieved from the network behavior data. A tag is generated by using the behavior information to create a behavior description for each network device and record the behavior descriptions in an identification database. In response to retrieving current network behavior data, the behavior information in the current network behavior data is parsed and compared with the tag of each behavior description in the identification database, and the network device to which the current network behavior data belong is identified based on a comparison result.

The disclosure provides a network connection apparatus, which includes a data retrieving apparatus, a storage apparatus, and a processor. The processor is coupled to the data retrieving apparatus and the storage apparatus, and is configured to retrieve network behavior data of a plurality of network devices connected to the network by using the data retrieving apparatus, retrieve a plurality of pieces of behavior information associated with each network device from the network behavior data, generate a tag by using the behavior information to create a behavior description for each network device and record the behavior descriptions in an identification database, in response to the data retrieving apparatus retrieving current network behavior data, parse behavior information in the current network behavior data and compare the behavior information with the tag of each behavior description in the identification database, and identify the network device to which the current network behavior data belong based on a comparison result.

The apparatus and the method for identifying the network device based on the network behavior in the disclosure utilize the network behavior observed by a firewall, including data such as network packets and connection frequencies, to automatically parse and identify the types and relevant details of protected devices. By conducting a precise analysis of the network behavior, activities of various devices can be effectively identified and recorded, thereby improving the efficiency of device security management.

To make the above-mentioned features and advantages of this disclosure more apparent and understandable, exemplary embodiments are described below in detail with reference to the accompanying drawings.

DESCRIPTION OF THE EMBODIMENTS

An exemplary embodiment of this disclosure provides an apparatus and a method for identifying a network device based on network behavior, which is based on a firewall technology and adopts an advanced method to record network behavior and further perform device identification, which can achieve dynamic analysis of the network behavior and the device identification. The network device identification apparatus of an exemplary embodiment of this disclosure can automatically parse and identify devices connected to the network through network data (such as network packets, connection frequency, and so on) recorded by a firewall, machine learning models, and the big data analysis technology.

Figure 1:
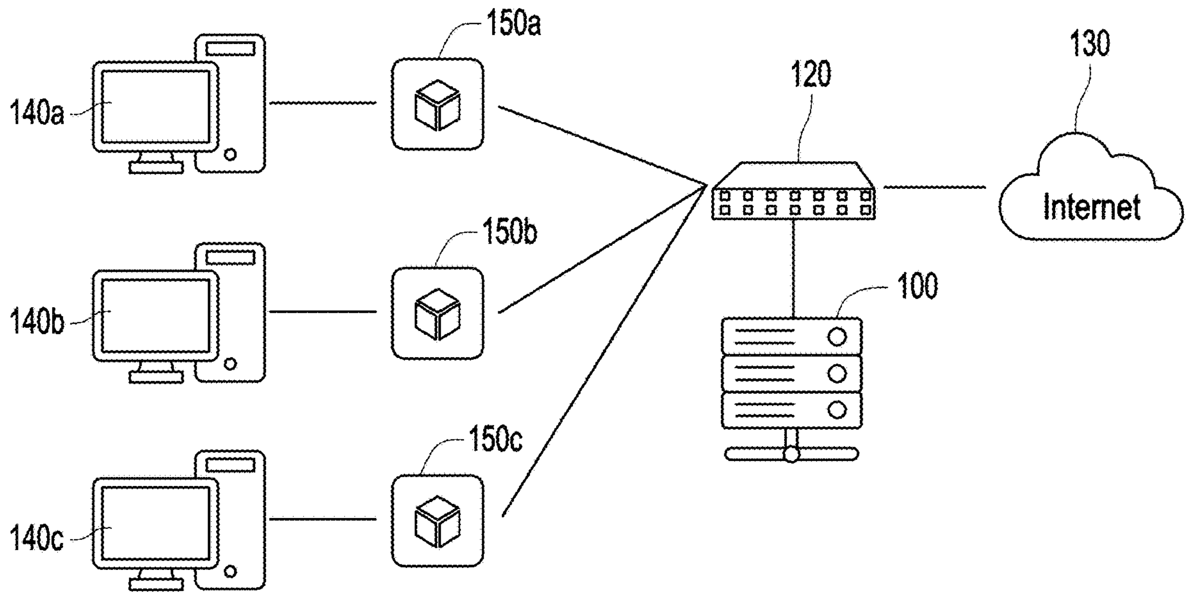
FIG. 1 is a network architecture diagram illustrated according to an exemplary embodiment of this disclosure.

FIG. 1 is a network architecture diagram illustrated according to an exemplary embodiment of this disclosure. With reference to FIG. 1, this exemplary embodiment involves establishing a network apparatus 120 between a plurality of network devices 140*a* to 140*c* within an internal network and an internet 130. The network apparatus 120 is, for instance, an electronic apparatus capable of serially connecting different networks and forwarding packets, such as a router, a switch, a personal computer, a server, a workstation, and so forth. It may monitor packets traveling between the network devices 140*a* to 140*c* and the internet 130 according to pre-set packet passing rules (e.g., firewall rules) and simply allow packets that comply with the rules to pass through.

The network devices 140*a* to 140*c* are, for instance, electronic apparatuses with network connectivity functions, such as personal computers, mobile phones, tablet computers, Internet of Things (IoT) devices, and so on. When executing application programs 150*a* to 150*c*, the network devices 140*a* to 140*c* may generate network behavior that is frequently connected to specific target internet protocol (IP) addresses or target ports. The network behavior may be learned and serve as a basis for future identification of the network devices 140*a* to 140*c*.

In this exemplary embodiment, the network device identification apparatus 100 is connected to the network apparatus 120, for instance, so as to retrieve network behavior data of the network devices 140*a* to 140*c* connected to the internet 130 from the network apparatus 120. The network device identification apparatus 100 can accurately parse the network behavior of network devices 140*a* to 140*c* by parsing the network behavior data, effectively identify the network devices 140*a* to 140*c*, and record activities of the network devices 140*a* to 140*c*, thereby improving the efficiency of device security management.

Figure 2:
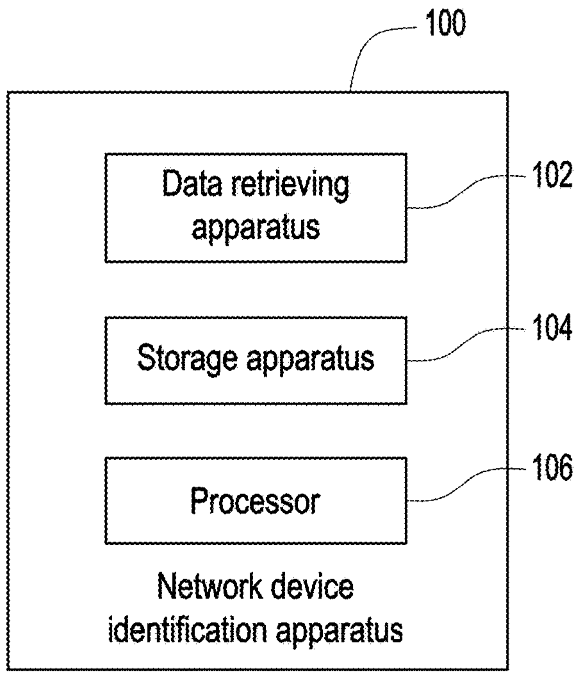
FIG. 2 is a block diagram of a network device identification apparatus illustrated according to an exemplary embodiment of this disclosure.

FIG. 2 is a block diagram of a network device identification apparatus illustrated according to an exemplary embodiment of this disclosure. With reference to FIG. 1 and FIG. 2 simultaneously, the network device identification apparatus 100 of this exemplary embodiment is, for instance, an electronic apparatus, such as a personal computer, a server, a workstation, and so on. It may, for instance, allow enterprise IT personnel or other users to set rules for packet passing and transmit these rules to the network apparatus 120 for the network apparatus 120 to set up a firewall accordingly.

In some exemplary embodiments, when packets from the internet 130 enter, the network apparatus 120 may first check whether the packets meet the filtering rules and then forward the filtered packets to the network device identification apparatus 100 for network service layer inspection.

The network device identification apparatus 100 includes a data retrieving apparatus 102, a storage apparatus 104, and a processor 106, of which the types and functions are described below.

The data retrieving apparatus 102 is, for instance, a network card or a network device supporting Ethernet or wireless network standards, such as 802.11g, 802.11n, 802.11ac, and so on, and is configured to connect the network and connect the network apparatus 120 through the network to retrieve network behavior data of the network devices 140*a* to 140*c* connected to the internet 130 from the network apparatus 120. In some exemplary embodiments, the data retrieving apparatus 102 may also be a communication apparatus supporting communication protocols, such as wireless fidelity (Wi-Fi), radio frequency identification (RFID), Bluetooth, infrared, near-field communication (NFC), device-to-device (D2D), and so on, and is configured to retrieve network behavior data from the network apparatus 120. The type of the data retrieving apparatus 102 is not limited in this exemplary embodiment.

The storage apparatus 104 is, for instance, any type of fixed or movable random access memory (RAM), read-only memory (ROM), flash memory, similar components, or a combination of the above components. The storage apparatus 104 stores computer programs executable by the processor 106, for instance. In this exemplary embodiment, the storage apparatus 104 records an identification database configured to identify the network devices 140*a* to 140*c*.

The processor 106 is, for instance, a central processing unit (CPU) or graphics processing unit (GPU), or any other programmable general-purpose or special-purpose microprocessor, digital signal processor (DSP), programmable controller, application specific integrated circuit (ASIC), programmable logic devices (PLD), any other similar device, or a combination thereof. In this exemplary embodiment, the processor 106 is coupled to the data retrieving apparatus 102 and the storage apparatus 104, respectively. The processor 106 can load and execute computer programs stored in the storage apparatus 104 to perform the method of identifying the network device based on the network behavior according to the exemplary embodiments of this disclosure.

Figures 3, 4:
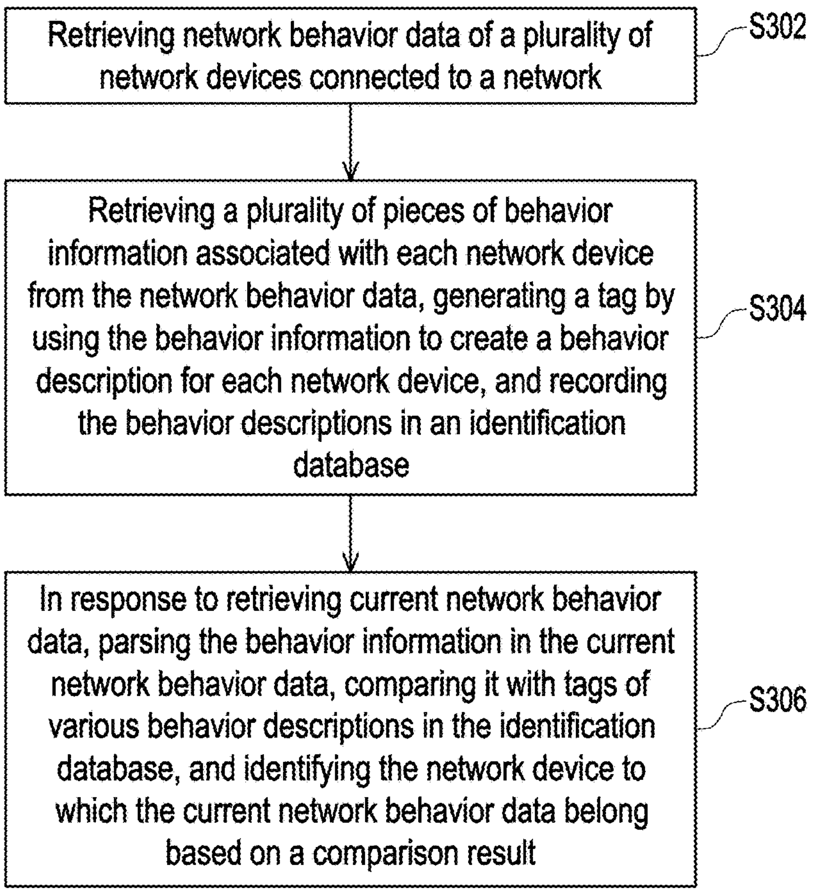
FIG. 3 is a flowchart of a method for identifying a network device based on network behavior illustrated according to an exemplary embodiment of this disclosure.
FIG. 4 illustrates exemplary network behavior data according to an exemplary embodiment of this disclosure.

FIG. 3 is a flowchart of a method for identifying a network device based on network behavior illustrated according to an exemplary embodiment of this disclosure. With reference to FIG. 2 and FIG. 3 simultaneously, the method of this exemplary embodiment is applicable to the aforementioned network device identification apparatus 100. Following detailed steps of the network device identification method in this exemplary embodiment are explained together with the various apparatuses and elements of the network device identification apparatus 100.

In step S302, the processor 106 of the network device identification apparatus 100 retrieves network behavior data of a plurality of network devices connected to the network. The processor 106, for instance, retrieves the network behavior data from a firewall log. The firewall log, for instance, comes from the network apparatus 120 or its own firewall, and the source of the firewall log is not limited in this exemplary embodiment.

In step S304, the processor 106 retrieves a plurality of pieces of behavior information associated with each network device from the network behavior data, generate a tag by using the behavior information to create a behavior description for each network device, and record the behavior descriptions in the identification database. The behavior information includes one or more of a source IP address, a source port, a target IP address, a target port, a communication protocol, and a connection frequency, which should however not be construed as a limitation in this exemplary embodiment. In some exemplary embodiments, in the identification database, the same network device usually has only one unique identifier. If there are two or more identical network devices, their IP addresses and media access control (MAC) addresses are different, so that these network devices are considered as different devices, but their behavior will be classified as the same type of device.

In some exemplary embodiments, the processor 106, in response to the behavior information recording network behavior where the communication protocol is a user datagram protocol (UDP), the source IP address is different, the target IP address is the same, and the target port is the same, a tag is generated by using the UDP and the target port for the network device of the target IP address; in response to the behavior information recording network behavior where the communication protocol is a transmission control protocol (TCP), the source IP address is different, the target IP address is the same, and the target port is the same, a tag is generated by using the TCP and the target port for the network device of the target IP address; in response to the behavior information recording network behavior where the communication protocol is the UDP, the source IP address is the same, the target IP address is different, and the target port is the same, a tag is generated by using the UDP and the target port for the network device of the source IP address; and in response to the behavior information recording network behavior where the communication protocol is the TCP, the source IP address is the same, the target IP address is different, and the target port is the same, a tag is generated by using the TCP and the target port for the network device of the source IP address.

In some exemplary embodiments, the processor 106, for instance, accumulates the number of occurrences of each network behavior and determines whether the accumulated number exceeds a predetermined number. In response to the accumulated number exceeding the predetermined number, the processor 106 adds the tag corresponding to the network behavior to the behavior description of the network device.

Specifically, FIG. 4 illustrates exemplary network behavior data according to an exemplary embodiment of this disclosure. With reference to FIG. 4, the network behavior data 400 of this exemplary embodiment may be obtained from a firewall log. The first row is taken as an example, and the most important behavior information includes the communication protocol (e.g., TCP, UDP), the source IP address (e.g., 192.168.168.171), the source port (which may be any value from 1 to 65535), the target IP address (e.g., 35.80.177.106), the target port (e.g., 443), etc., which may be applied to indicate the network behavior derived from specific application program activities. The total count (e.g., 8) is the accumulated number of connections (i.e., the number of occurrences of network behavior), which can serve to determine whether the network behavior is a frequently occurring normal activity. The core of this exemplary embodiment of the disclosure lies in utilizing the normal network behavior activities of specific devices or the IoT devices to identify the device, so as to achieve the purpose of device or apparatus identification.

In the network behavior information, the source IP address (e.g., 192.168.168.171) and the target IP address (e.g., 35.80.177.106) may have different settings due to network configurations in the installation environment or different timing of service connection acquisition and thus are less reliable for device identification. Information such as the communication protocol (e.g., TCP) and the target port (e.g., 443), corresponding to the design of the application program service itself, tends to maintain fixed values. However, various applications also use temporary ports established by dynamic protocols. For instance, in TCP/IP applications, application program service target ports 49152 to 65535 act as dynamic protocol communication ports. Therefore, this exemplary embodiment of the disclosure focuses on observing fixed network behavior in the network behavior, such as the use of ports and the communication protocols, so as to identify specific devices or the IoT devices.

In the network behavior data 400 depicted in FIG. 4, for the network device with the source IP address 192.168.168.171, the source ports are mostly randomly assigned by the network protocol and lack identification value and thus are represented as "any". The target ports 443, 1443, 3478, and 1443, though corresponding to different target IP addresses, may be recorded as the fixed network behavior of the device together with the accumulations of the total count due to the continuity of the service behavior. In this exemplary embodiment, the recorded network behavior description includes the following four categories (the underlined part represents the target device IP address):

- Category 1: UDP, the source IP address is not fixed, the target IP address is fixed, the target port # same=>tag <SUPort #>;
- Category 2: TCP, the source IP address is not fixed, the target IP address is fixed, the target port # same=>tag <STPort #>;
- Category 3: UDP, the source IP address is fixed, the target IP address is not fixed, the target port # same=>tag <DUPort #>;
- Category 4: TCP, the source IP address is fixed, the target IP address is not fixed, the target port # same=>tag <DTPort #>.

Here, categories 1 and 2 represent the communication ports used by external IP addresses to establish connections to the target device, while categories 3 and 4 represent the communication ports used by the target device to connect external services. The information for all these categories can be obtained from the target port data.

The network device with the source IP address 192.168.168.171 in the network behavior data 400 depicted in FIG. 4 is taken as an example, and based on the first four pieces of behavior information in the network behavior data 400, the behavior descriptions may be recorded as:

<DT443, DT1443, DU3478>

In some exemplary embodiments, considering that only the behavior that repeatedly appears as normal patterns is included, after excluding behavior that only appears once occasionally (i.e., with a total count of 1), only <DT443, DU3478> are recorded.

However, if the fifth piece of behavior information in the network behavior data 400 is taken into consideration, it can be seen that the tag <DT1443> appears again. Therefore, it may be included in the frequently used port behavior, and <DT443, DT1443, DU3478> may be recorded.

In the above exemplary embodiment, behavior occurring more than once is considered as common fixed behavior. However, in actual application scenarios, it may be more complex, and as time passes, the frequency may be a relative value rather than an absolute magnitude. As the network device continues to operate, the descriptions of the behavior become more comprehensive. In this exemplary embodiment, by utilizing the network whitelist behavior pattern modeling technology, the network behavior can be classified into fixed behavior patterns and non-fixed temporary activities, and their behavior identification information may be recorded accordingly.

Return to the process in FIG. 3. In step S306, the processor 106, in response to retrieving current network behavior data, parses the behavior information in the current network behavior data and compares it with the tags of various behavior descriptions in the identification database, thereby identifying the network device to which the current network behavior data belong based on a comparison result.

Figure 5:
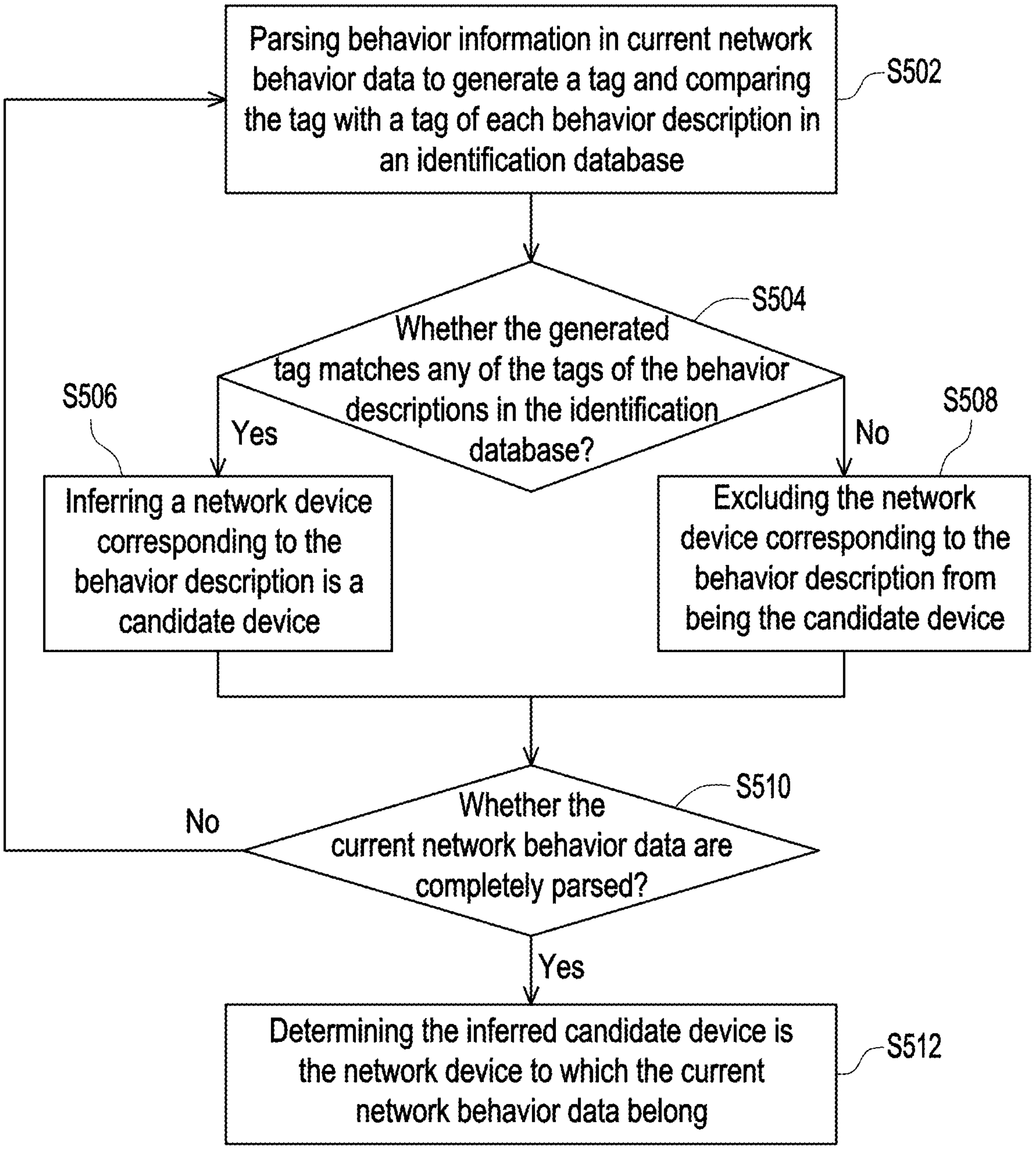
FIG. 5 is a flowchart of a method for identifying a network device based on an identification database illustrated according to an exemplary embodiment of this disclosure.

Specifically, FIG. 5 is a flowchart of a method for identifying a network device based on an identification database illustrated according to an exemplary embodiment of this disclosure. Please refer to FIG. 2 and FIG. 5 simultaneously. The method provided in this exemplary embodiment is applicable to the aforementioned network device identification apparatus 100. Detailed steps of the method for identifying the network device provided in this exemplary embodiment are explained in conjunction with various apparatuses and elements of the network device identification apparatus 100.

In step S502, the processor 106 of the network device identification apparatus 100 parses the behavior information in the current network behavior data to generate a tag and compares the tag with a tag of each of the behavior descriptions in the identification database. The current network behavior data, for instance, are data retrieved by the processor 106 through the data retrieving apparatus 102 from the network apparatus 120 or from its own firewall log over a period of time.

In step S504, the processor 106 determines whether the generated tag matches any of the tags of the behavior descriptions in the identification database.

In response to the generated tag matching one of the tags of the behavior descriptions (i.e., "Yes" in step S504), in step S506, the processor 106 infers that the network device corresponding to that behavior description is a candidate device.

In response to the generated tag not matching any of the tags of the behavior descriptions (i.e., "No" in step S504), in step S508, the processor 106 excludes the network device corresponding to that behavior description from being the candidate device (i.e., not included as the candidate device).

In step S510, the processor 106 determines whether the current network behavior data are completely parsed. If it is determined that the parsing of the current network behavior data is not yet completed, the process returns to step S502, where the processor 106 continues to parse the next piece of behavior information in the current network behavior data and performs comparison.

The processor 106 repeats steps S502 to S510 until the parsing of the current network behavior data is completed. In step S512, it determines that the inferred candidate device is the network device to which the current network behavior data belong. If, after executing steps S502 to S510, only one candidate device remains, this candidate device can be determined as the network device to which the current network behavior data belong.

On the other hand, in response to a plurality of the network devices being inferred as candidate devices, after a predetermined time, the processor 106 determines that the network device corresponding to the behavior description with the closest number of matched tags is the network device to which the current network behavior data belong.

To aid understanding, simple examples provided below illustrate an operational flow of three stages of behavior learning, database identification, and identification inference in exemplary embodiments of the disclosure.

Figure 6A:
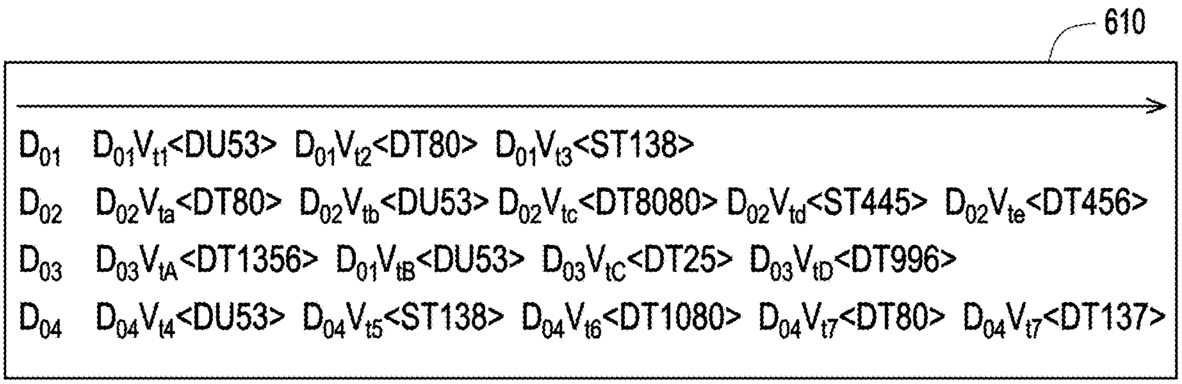
FIG. 6A illustrates exemplary behavior learning of a network device according to an exemplary embodiment of this disclosure.
Figure 6B:
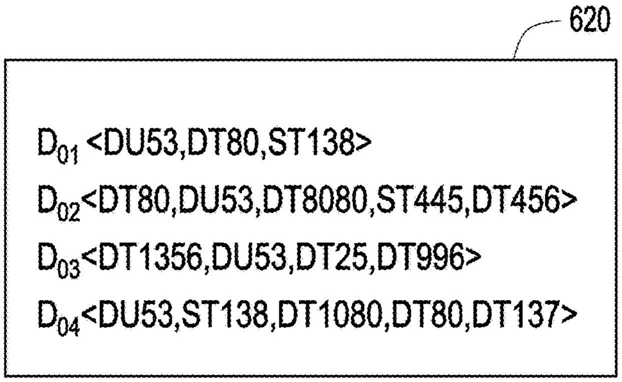
FIG. 6B illustrates exemplary identification database records according to an exemplary embodiment of this disclosure.
Figure 6C:
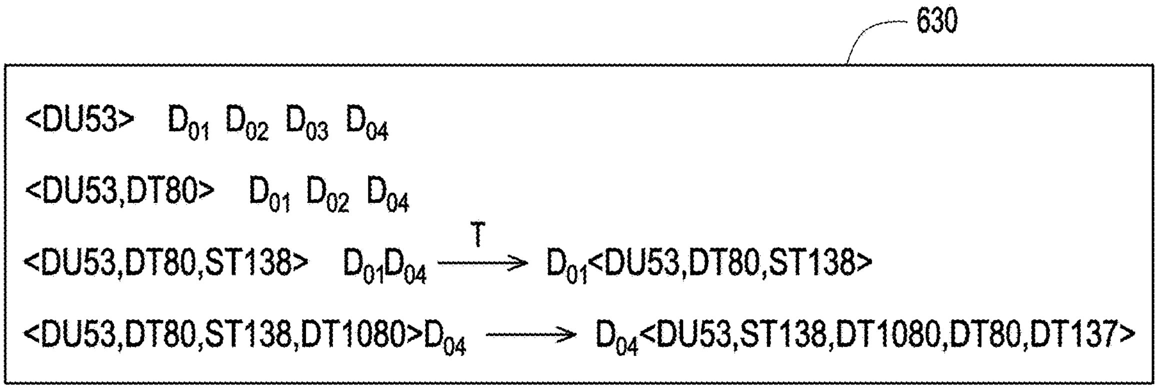
FIG. 6C illustrates an exemplary identification inference of a network device according to an exemplary embodiment of this disclosure.

FIG. 6A illustrates exemplary behavior learning of a network device according to an exemplary embodiment of this disclosure. FIG. 6B illustrates exemplary identification database records according to an exemplary embodiment of this disclosure. FIG. 6C illustrates an exemplary identification inference of a network device according to an exemplary embodiment of this disclosure. Please refer first to FIG. 6A, where a tag generation diagram 610 of this exemplary embodiment illustrates a tag generation process for network devices $D_{01}$, $D_{02}$, $D_{03}$, and $D_{04}$ during the behavior learning stage. Based on the firewall log, the network behavior of the network devices $D_{01}$, $D_{02}$, $D_{03}$, and $D_{04}$ can be observed, and their behavior information can be recorded sequentially. Here, V represents a vector for representing the network behavior observed at a specific time and generating tags in the format < . . . >. For instance, if the network device $D_{01}$ is observed at time t1 to send packets to a target port 53 by using the UDP, a tag $D_{01}V_{t1}$<DU53> may be generated; if the network device $D_{01}$ is observed at time t2 to send packets to a target port 80 by using the TCP, a tag $D_{01}V_{t2}$<DT80> may be generated, and the rest can be deduced therefrom.

Based on the results collected during the learning stage, the tag of each network device may be organized into behavior descriptions 620 as shown in FIG. 6B and recorded in the identification database. For instance, for the network device $D_{01}$, <DU53,DT80,ST138> may be recorded as its behavior description; for the network device $D_{02}$, <DT80, DU53,DT8080,ST445,DT456> may be recorded as its behavior description; for the network device $D_{03}$, <DT1356, DU53,DT25,DT996> may be recorded as its behavior description; for the network device $D_{04}$, <DU53,ST138, DT1080,DT80,DT137> may be recorded as its behavior description.

Finally, please refer to an identification inference flow diagram 630 for the network devices shown in FIG. 6C.

First, for the IP address of an unknown network device, when the tag <DU53> is generated through parsing its behavior information, it may be confirmed from the records in the identification database that the behavior descriptions of all four network devices $D_{01}$, $D_{02}$, $D_{03}$, and $D_{04}$ contain the tag <DU53>, and therefore the network devices $D_{01}$, $D_{02}$, $D_{03}$, and $D_{04}$ are inferred as the candidate devices.

Next, when the tag <DT80> is generated through parsing the behavior information, the possibility of the network device $D_{03}$ can be eliminated, and at this time, the network devices $D_{01}$, $D_{02}$, and $D_{04}$ are still inferred as the candidate devices.

Then, when the tag <ST138> is generated through parsing the behavior information, it may be confirmed that the behavior descriptions of the network devices $D_{01}$ and $D_{04}$ both contain the tag <DU53>, and therefore the network devices $D_{01}$ and $D_{04}$ are inferred as the candidate devices.

If, after a continuous duration of a predetermined time T (for instance, one week), no new network behavior is received (other behavior continues to occur normally), it can be considered as converged, and the network device represented by this IP address can be determined as $D_{01}$; on the other hand, if the tags <DT1080> and <DT187> are continuously generated through parsing the behavior information subsequently, the network device represented by this IP address can be determined as $D_{04}$.

In some exemplary embodiments, the network device identification apparatus may utilize the tag (including the target ports) in the behavior description of each network device as an input and utilize the identification information (ID) of the network device as an output for training. Through convolutional self-convergence, the trained machine learning model can identify the network device to which the current network behavior data belong based on the tags obtained by parsing the current network behavior data. In some exemplary embodiments, the network device identification apparatus may apply statistical methods for accumulation and set thresholds as determination criteria, thus using the network behavior exceeding the threshold to establish normal rules. The optimal threshold may be inferred through machine learning models using actual data to distinguish whether to be listed as normal. Moreover, network behavior with accumulated counts not reaching the threshold can be included in a waiting list and differentiated according to different IP addresses. For network behavior with different IP addresses but the same target port, when purely considering the frequency of use of the target port, although the number of connections from that IP address is insufficient to be included in the normal model, the behavior of repeatedly accessing the same target port may still be considered as normal. The aforementioned machine learning model can be, for instance, convolutional neural networks (CNN) or recursive neural networks (RNN), and its type should not be construed as a limitation in this exemplary embodiment.

In the above exemplary embodiment, the network device identification apparatus 100 and the network apparatus 120 are located in the same network (an internal network), and the network device identification apparatus 100 is connected to the network apparatus 120 through the data retrieving apparatus 102 to retrieve network behavior data from the network apparatus 120 for parsing. In other exemplary embodiments, the network device identification apparatus can also be a server located in the cloud or integrated with the network apparatus as a single device. Its architecture should not be construed as a limitation in this exemplary embodiment. In some exemplary embodiments, the network device identification apparatus can parse the current network behavior data locally and identify the network device through the cloud. Its computation method should also not be construed as a limitation in this exemplary embodiment. Following exemplary embodiments are provided for elaboration.

Figure 7:
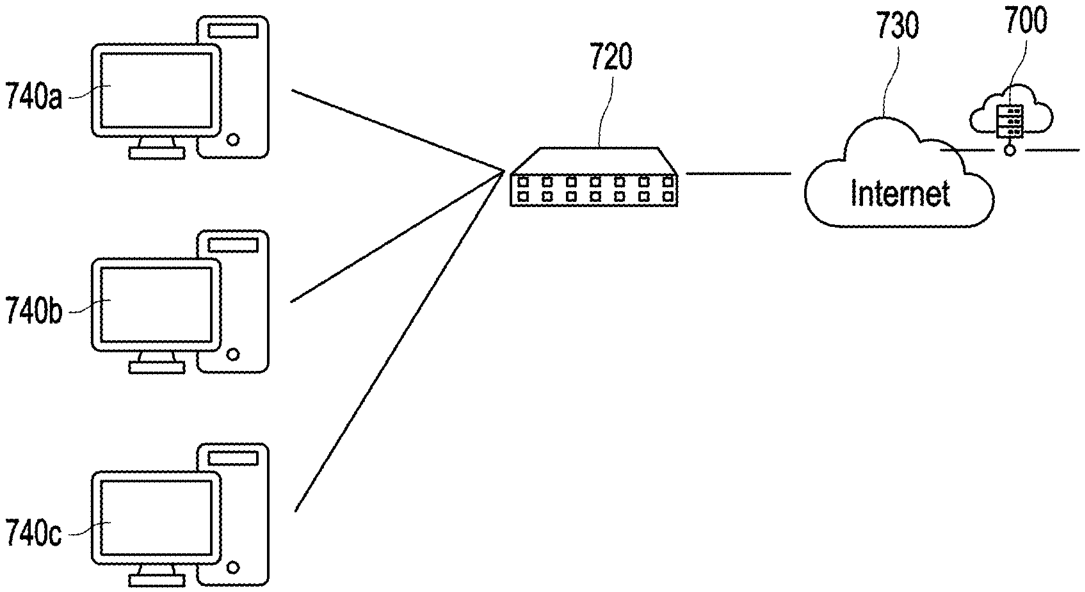
FIG. 7 is a network architecture diagram illustrated according to an exemplary embodiment of this disclosure.

FIG. 7 is a network architecture diagram illustrated according to an exemplary embodiment of this disclosure. Please refer to FIG. 7, and this exemplary embodiment involves setting up a network apparatus 720 between a plurality of network devices 740*a* to 740*c* located in an internal network and an internet 730. This network apparatus 720 is, for instance, a router, a switch, a personal computer, a server, a workstation, or any other electronic apparatus capable of connecting different networks and forwarding packets. It can monitor packets traveling between the network devices 740*a* to 740*c* and the internet 730 based on pre-configured packet passing rules (such as firewall rules) and only allow packets that comply with the rules to pass through. The network devices 740*a* to 740*c* are, for instance, personal computers or electronic apparatuses with network capabilities, such as mobile phones, tablet computers, IoT devices, and so on. Their types should not be construed as a limitation in this exemplary embodiment.

In this exemplary embodiment, for instance, a network device identification apparatus 700 located in the cloud is connected to the network apparatus 720 through the internet 730 to retrieve network behavior data of the network devices 740*a* to 740*c* connected to the internet 730 from the network apparatus 120. The network device identification apparatus 700 can accurately parse the network behavior of the network devices 740*a* to 740*c* by parsing the network behavior data, effectively identify the network devices 740*a* to 740*c* and record the activities of the network devices 740*a* to 740*c*, and thereby improve the management efficiency of device security.

Figure 8:
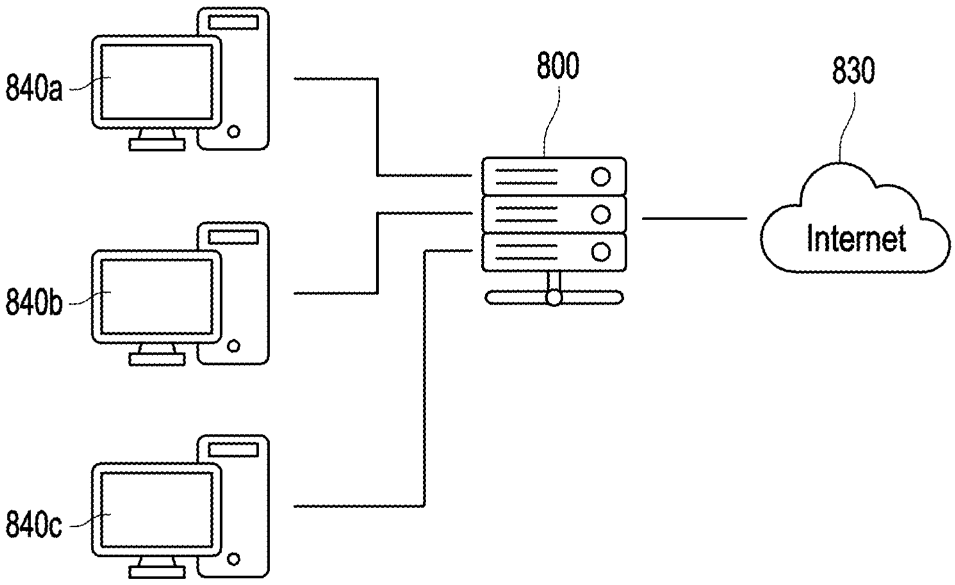
FIG. 8 is a network architecture diagram illustrated according to an exemplary embodiment of this disclosure.

FIG. 8 is a network architecture diagram illustrated according to an exemplary embodiment of this disclosure. Please refer to FIG. 8, and in this exemplary embodiment, a network device identification apparatus 800 serves as a network apparatus to connect a plurality of network devices 840*a* to 840*c* located in an internal network to the internet 830. The network device identification apparatus 800 is, for instance, a router, a switch, a personal computer, a multi-point network server, a workstation, or any other electronic apparatus capable of connecting different networks and forwarding packets. It may monitor packets traveling between the network devices 840*a* to 840*c* and the internet 830 based on pre-configured packet passing rules (such as firewall rules) and only allow packets that comply with the rules to pass through. The network devices 840*a* to 840*c* is, for instance, personal computers or electronic apparatuses with network capabilities, such as mobile phones, tablet computers, IoT devices, and so on. Their types should not be construed as a limitation in this exemplary embodiment.

In this exemplary embodiment, for instance, the network device identification apparatus 800 located between the network devices 840*a* to 840*c* and the internet 830 directly retrieves the network behavior data of the network devices 840*a* to 840*c* connecting the internet 830. The network device identification apparatus 800 can accurately parse the network behavior of the network devices 840*a* to 840*c* by parsing the network behavior data, effectively identify and record the activities of the network devices 840*a* to 840*c*, and thereby improve the management efficiency of device security.

Figure 9:
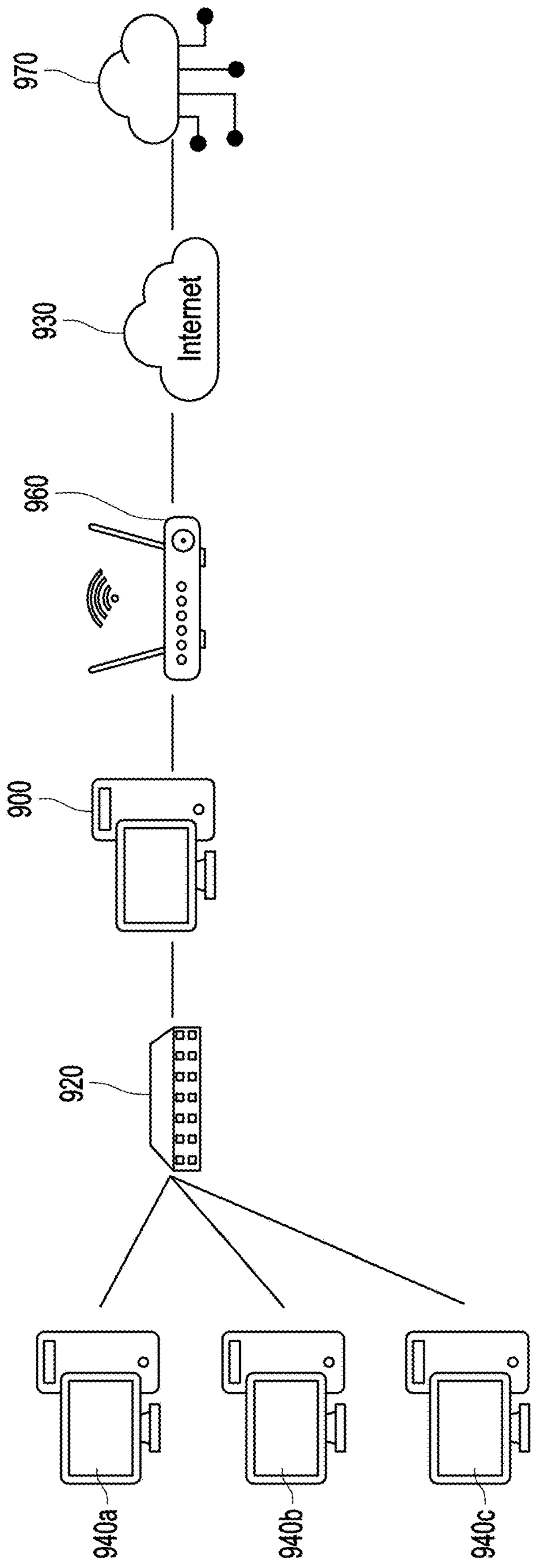
FIG. 9 is a network architecture diagram illustrated according to an exemplary embodiment of this disclosure.

FIG. 9 is a network architecture diagram illustrated according to an exemplary embodiment of this disclosure. Please refer to FIG. 9, and in this exemplary embodiment, a network device identification apparatus 900 is connected to a plurality network devices 940*a* to 940*c* through a network apparatus 920, such as a wireless access point (AP) or a hub, and is connected to the internet 930 through a router 960, thus allowing the network devices 940*a* to 940*c* to connect the internet 930 through the network device identification apparatus 900. The network device identification apparatus 900 is, for instance, a personal computer, a multi-point network server, a workstation, or any other electronic apparatus capable of connecting different networks and forwarding packets. It may monitor packets traveling between the network devices 940*a* to 940*c* and the internet 930 based on pre-configured packet passing rules (such as firewall rules) and only allow packets that comply with the rules to pass through. The network devices 940*a* to 940*c* are, for instance, personal computers or electronic apparatuses with network capabilities, such as mobile phones, tablet computers, IoT devices, and so on. Their types should not be construed as a limitation in this exemplary embodiment.

In this exemplary embodiment, for instance, the network device identification apparatus 900 located between the network devices 940*a* to 940*c* and the internet 930 directly retrieves the network behavior data of the network devices 940*a* to 940*c* connecting the internet 930. The network device identification apparatus 900 can accurately parse the network behavior of the network devices 940*a* to 940*c* by parsing the network behavior data, and by comparing the parsed behavior information with the tags of various behavior descriptions stored in the identification database in the cloud apparatus 970, it may effectively identify the network devices 940*a* to 940*c* to which the current network behavior data belong and record the activities of the network devices 940*a* to 940*c* based on the comparison result, thereby improving the management efficiency of device security. In some exemplary embodiments, the network device identification apparatus 900 can, for instance, upload the behavior information to the cloud apparatus 970 after parsing out the behavior information, and the cloud apparatus 970 compares the behavior information with the tags of various behavior descriptions in the identification database to identify the network devices 940*a* to 940*c* and sends the identification result back to the network device identification apparatus 900. In other exemplary embodiments, the network device identification apparatus 900 can also directly upload the retrieved network behavior data to the cloud apparatus 970, and the cloud apparatus 970 parses the network behavior data and compares the parsing result with the tags of various behavior descriptions stored in the identification database in the cloud apparatus 970, thereby identifying the network devices 940*a* to 940*c* to which the current network behavior data belong.

The methods for parsing the network behavior data and identifying the network device by applying the aforementioned network device identification apparatuses 700, 800, and 900 are the same as or similar to the method by applying the network device identification apparatus 100 in the previously described exemplary embodiments, and thus their detailed implementation manner will not be repeated hereinafter.

Through continuous learning in the above-mentioned method/algorithm, the network device identification apparatus of this exemplary embodiment can establish feature vectors of all network devices from the network behavior and simultaneously, through continuous observation of the network behavior, infer the corresponding network device for that behavior.

The characteristics of the method/algorithm in this exemplary embodiment do not lie in providing precise and clear identification directly at once but in continuously learning and establishing a behavior database of the network devices through long-term observations; meanwhile, different network devices in the network are also parsed out through long-term observation. Although considering only the usage of the network ports may still result in the network devices with similar behavior, the network port behavior is highly related to the functional design of application programs and services. Therefore, it still has a significant effect on identifying different devices or application services.

In the above exemplary embodiment, although only ports act as the main identification tag elements, after the source port (S), the target port (D), and the communication protocol (T/U) are added, considerably high identification capability can be provided.

To sum up, the apparatus and the method for identifying the network device based on the network behavior provided in the disclosure, by progressive learning, device identification inference through a meticulous process as the core, and the introduction of automated data analysis technology, can be dynamically adapted to changes in the network environment and enhance security protection effects. Besides, by utilizing detailed network behavior data collected by the firewall, connected devices can be accurately identified, and thereby the precision and efficiency of network management can be improved. Moreover, through real-time monitoring and analysis of the network behavior, potential security threats can be detected and prevented in a timely manner, and the overall network security can be enhanced.

Although the disclosure has been disclosed in the exemplary embodiments as provided above, the exemplary embodiments are not intended to limit the disclosure. Any person skilled in the art can make some modifications and variations without departing from the spirit and the scope of the disclosure. Therefore, the protection scope of the disclosure should be defined by the appended claims.

What is claimed is:

1. A method for identifying a network device based on network behavior, the method being adapted for an electronic apparatus having a processor to identify the network device connected to a network and comprising following steps:

retrieving network behavior data of a plurality of the network devices connected to the network;

retrieving a plurality of pieces of behavior information associated with each of the network devices from the network behavior data, generating a tag by using the behavior information to create a behavior description of each of the network devices and recording the behavior descriptions in an identification database; and in response to retrieving current network behavior data, parsing and comparing behavior information in the current network behavior data with the tag created from each of the behavior descriptions in the identification database, and identifying the network device to which the current network behavior data belong based on a comparison result, wherein the behavior information comprises one or more of a source internet protocol address, a source port, a target internet protocol address, a target port, a communication protocol, and a connection frequency, wherein the step of generating the tag by using the behavior information to create the behavior description of each of the network devices comprises:

in response to the behavior information recording network behavior where the communication protocol is a user datagram protocol, the source internet protocol address is different, the target internet protocol address is the same, and the target port is the same, generating the tag for the network device of the target internet protocol address by using the user datagram protocol and the target port;

in response to the behavior information recording network behavior where the communication protocol is a transmission control protocol, the source internet protocol address is different, the target internet protocol address is the same, and the target port is the same, generating the tag for the network device of the target internet protocol address by using the transmission control protocol and the target port;

in response to the behavior information recording network behavior where the communication protocol is the user datagram protocol, the source internet protocol address is the same, the target internet protocol address is different, and the target port is the same, generating the tag for the network device of the source internet protocol address by using the user datagram protocol and the target port; and in response to the behavior information recording network behavior where the communication protocol is the transmission control protocol, the source internet protocol address is the same, the target internet protocol address is different, and the target port is the same, generating the tag for the network device of the source internet protocol address by using the transmission control protocol and the target port.

2. The method according to claim 1, wherein the step of generating the tag by using the behavior information to create the behavior description of each of the network devices and recording the behavior descriptions in the identification database comprises:

accumulating the number of occurrences of each of the network behavior and determining whether the accumulated number exceeds a predetermined number; and in response to the accumulated number exceeding the predetermined number, adding the tag corresponding to the network behavior to the behavior description of the network device.

3. The method according to claim 1, wherein the step of parsing and comparing the behavior information in the current network behavior data with the tag of each of the behavior descriptions in the identification database and identifying the network device to which the current network behavior data belong based on the comparison result comprises:

parsing the behavior information in the current network behavior data to generate the tag and comparing with the tag of each of the behavior descriptions in the identification database;

in response to the generated tag matching one of the tags of the behavior descriptions, inferring the network device corresponding to the behavior description as a candidate device;

in response to the generated tag not matching any of the tags of the behavior descriptions, excluding the network device corresponding to the behavior description from being the candidate device; and repeating the above steps until the parsing of the current network behavior data is completed and determining the inferred candidate device as the network device to which the current network behavior data belong.

4. The method according to claim 3, wherein the step of parsing and comparing the behavior information in the current network behavior data with the tag of each of the behavior descriptions in the identification database and identifying the network device to which the current network behavior data belong based on the comparison result comprises:

in response to a plurality of the network devices being inferred as the candidate devices, after a predetermined time, determining the network device corresponding to the behavior description with the closest number of matched tags as the network device to which the current network behavior data belong.

5. The method according to claim 1, wherein the step of retrieving the network behavior data of the network devices connected to the network comprises:

retrieving the network behavior data from a firewall log.

6. The method according to claim 1, wherein the step of generating the tag by using the behavior information to create the behavior description of each of the network devices and recording the behavior description in the identification database comprises:

using the tag in the behavior description of each of the network devices as an input, and using identification information of the network device as an output to train a machine learning model, so that the trained machine learning model identifies the network device to which the current network behavior data belong based on the tag obtained by parsing the current network behavior data.

7. An apparatus for identifying a network device based on network behavior, the apparatus comprising:

a data retrieving apparatus;

a storage apparatus; and a processor, coupled to the data retrieving apparatus and the storage apparatus and configured to:

retrieve network behavior data of a plurality of network devices connected to a network by using the data retrieving apparatus;

retrieve a plurality of pieces of behavior information associated with each of the network devices from the network behavior data, generate a tag by using the behavior information to create a behavior description of each of the network devices, and record the behavior descriptions in an identification database; and in response to the data retrieving apparatus retrieving current network behavior data, parse and compare behavior information in the current network behavior data with the tag created from each of the behavior descriptions in the identification database and identify the network device to which the current network behavior data belong based on a comparison result, wherein the behavior information comprises one or more of a source internet protocol address, a source port, a target internet protocol address, a target port, and a communication protocol, wherein the processor is configured to:

in response to the behavior information recording network behavior where the communication protocol is a user datagram protocol, the source internet protocol address is different, the target internet protocol address is the same, and the target port is the same, generate the tag for the network device of the target internet protocol address by using the user datagram protocol and the target port;

in response to the behavior information recording network behavior where the communication protocol is a transmission control protocol, the source internet protocol address is different, the target internet protocol address is the same, and the target port is the same, generate the tag for the network device of the target internet protocol address by using the transmission control protocol and the target port;

in response to the behavior information recording network behavior where the communication protocol is the user datagram protocol, the source internet protocol address is the same, the target IP address is different, and the target port is the same, generate the tag for the network device of the source internet protocol address by using the user datagram protocol and the target port; and in response to the behavior information recording network behavior where the communication protocol is the transmission control protocol, the source internet protocol address is the same, the target internet protocol address is different, and the target port is the same, generate the tag for the network device of the source internet protocol address by using the transmission control protocol and the target port.

8. The apparatus for identifying the network device based on the network behavior according to claim 7, wherein the processor is further configured to:

accumulate the number of occurrences of each of the network behavior and determine whether the accumulated number exceeds a predetermined number; and in response to the accumulated number exceeding the predetermined number, add the tag corresponding to the network behavior to the behavior description of the network device.

9. The apparatus for identifying the network device based on the network behavior according to claim 7, wherein the processor is configured to:

parse the behavior information in the current network behavior data to generate the tag and comparing with the tag of each of the behavior descriptions in the identification database;

in response to the generated tag matching one of the tags of the behavior descriptions, infer the network device corresponding to the behavior description as a candidate device;

in response to the generated tag not matching any of the tags of the behavior descriptions, exclude the network device corresponding to the behavior description from being the candidate device; and repeat the above steps until the parsing of all the current network behavior data is completed, and determine the inferred candidate device as the network device to which the current network behavior data belong.

10. The apparatus for identifying the network device based on the network behavior according to claim 9, wherein the processor is further configured to:

in response to a plurality of the network devices being inferred as the candidate devices, after a predetermined time, determine the network device corresponding to the behavior description with the closest number of matched tags as the network device to which the current network behavior data belong.

11. The apparatus for identifying the network device based on the network behavior according to claim 7, wherein the processor is configured to:

retrieve the network behavior data from a firewall log.

12. The apparatus for identifying the network device based on the network behavior according to claim 7, wherein the processor is configured to:

use the tag in the behavior description of each of the network devices as an input and use the identification information of the network device as an output to train a machine learning model, so that the trained machine learning model identifies the network device to which the current network behavior data belong based on the tags obtained by parsing the current network behavior data.

13. The apparatus for identifying the network device based on the network behavior according to claim 7, wherein the processor is connected to a network apparatus through the data retrieving apparatus to retrieve the network behavior data from the network apparatus, wherein the network apparatus connects each of the network devices to the network.

14. The apparatus for identifying the network device based on the network behavior according to claim 7, wherein the processor is connected to the network through the data retrieving apparatus and connected to a network apparatus through the network to retrieve the network behavior data from the network apparatus, wherein the network apparatus connects each of the network devices to the network.

15. The apparatus for identifying the network device based on the network behavior according to claim 7, wherein the processor connects each of the network devices to the network through the data retrieving apparatus as a network apparatus and retrieves the network behavior data of each of the network devices connected to the network.

16. The apparatus for identifying the network device based on the network behavior according to claim 7, wherein the identification database is stored in a cloud apparatus, and in response to the data retrieving apparatus retrieving the current network behavior data, the processor parses the behavior information in the current network behavior data, and through comparison with the tag of each of the behavior descriptions stored in the identification database in the cloud apparatus, the processor identifies the network device to which the current network behavior data belong based on a comparison result.

* * * * *